Nov. 21, 1967  E. F. ZINK  3,353,693

SELF-LOADING VEHICLE

Original Filed Jan. 18, 1966  3 Sheets-Sheet 1

*INVENTOR.*
EDWARD F. ZINK

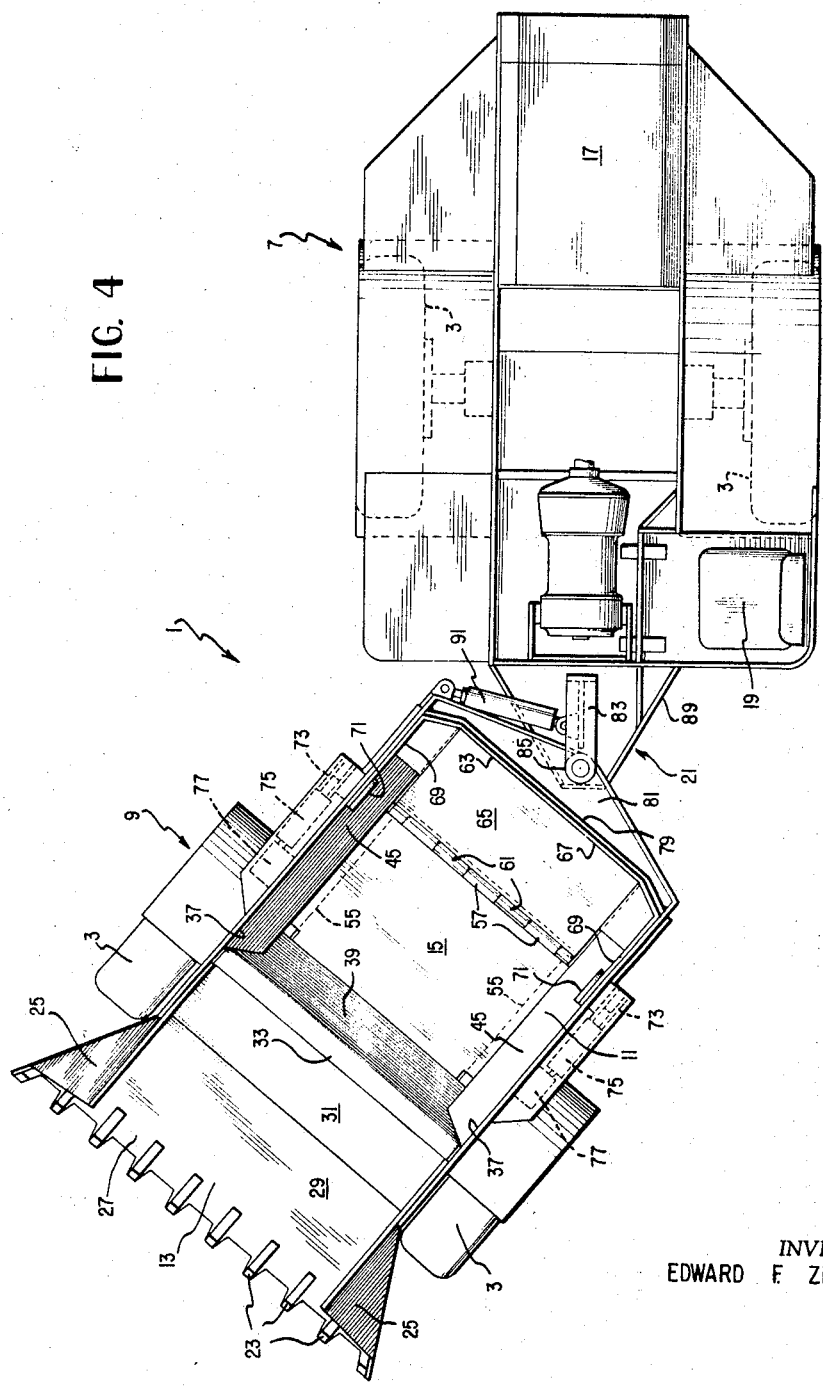

Nov. 21, 1967  E. F. ZINK  3,353,693
SELF-LOADING VEHICLE

Original Filed Jan. 18, 1966  3 Sheets-Sheet 3

INVENTOR.
EDWARD F. ZINK

United States Patent Office 3,353,693
Patented Nov. 21, 1967

3,353,693
SELF-LOADING VEHICLE
Edward F. Zink, Knoxville, Tenn., assignor, by mesne assignments, to Joy Manufacturing Company, Pittsburgh, Pa., a corporation of Pennsylvania
Application Jan. 18, 1966, Ser. No. 526,013, which is a continuation of application Ser. No. 254,385, Jan. 28, 1963. Divided and this application Nov. 17, 1966, Ser. No. 595,221
7 Claims. (Cl. 214—78)

ABSTRACT OF THE DISCLOSURE

A mobile self-loading vehicle including a material receiving body and a shovel pivotably mounted to the body for loading material therein, a closure for a dump opening through the bottom of the body which closure includes a first plate member slidably supported adjacent the dump opening, a second plate member articulated to the rear end of the first plate member and the second plate member is supported to move in a generally arcuate path in a manner to move the first plate member to open the dump opening.

---

This application is a divisional application of the continuation U.S. patent application 526,013 filed Jan. 18, 1966, of U.S. patent application 254,385, filed Jan. 28, 1963, entitled, "Self-Loading Vehicle."

The present invention relates to self-loading vehicles, more particularly self-loading vehicles of the forward-crowding loader type having a vertically swinging load support including a front-loading shovel that discharges into a material-receiving body that is carried by the vehicle and that has a bottom door that opens to dump.

It is an object of the present invention to provide a self-loading vehicle that requires only low head room.

Another object of the present invention is the provision of a self-loading vehicle having maximum load-carrying capacity.

Still another object of the present invention is the provision of a self-loading vehicle having a vertically swinging load support that facilitates distribution of the load in the material receiving body.

It is also an object of the present invention to provide a self-loading vehicle having a material-receiving body with a bottom door that opens to dump, in which the bottom door is so constructed and arranged as to increase the load-carrying capacity of the material-receiving body.

Yet another object of the present invention is the provision of a self-loading vehicle of the forward-crowding loader type, in which the tractive effort needed for loading is greatly reduced.

The invention also contemplates the provision of a wheeled self-loading vehicle in which the weight of the load tends to be distributed more uniformly among the sets of wheels.

It is also an object of the present invention to provide a wheeled self-loading vehicle well adapted to traverse uneven terrain.

Finally, it is an object of the present invention to provide a self-loading vehicle which will be relatively economical to manufacture, compact and strong in its construction, rapid and efficient in its operation, and rugged and durable in use.

Other objects and advantages of the present invention will become apparent from a consideration of the following description, taken in connection with the accompanying drawings, in which:

FIGURE 4 is a plan view of the self-loading vehicle of FIGURE 1;

Figure 1:
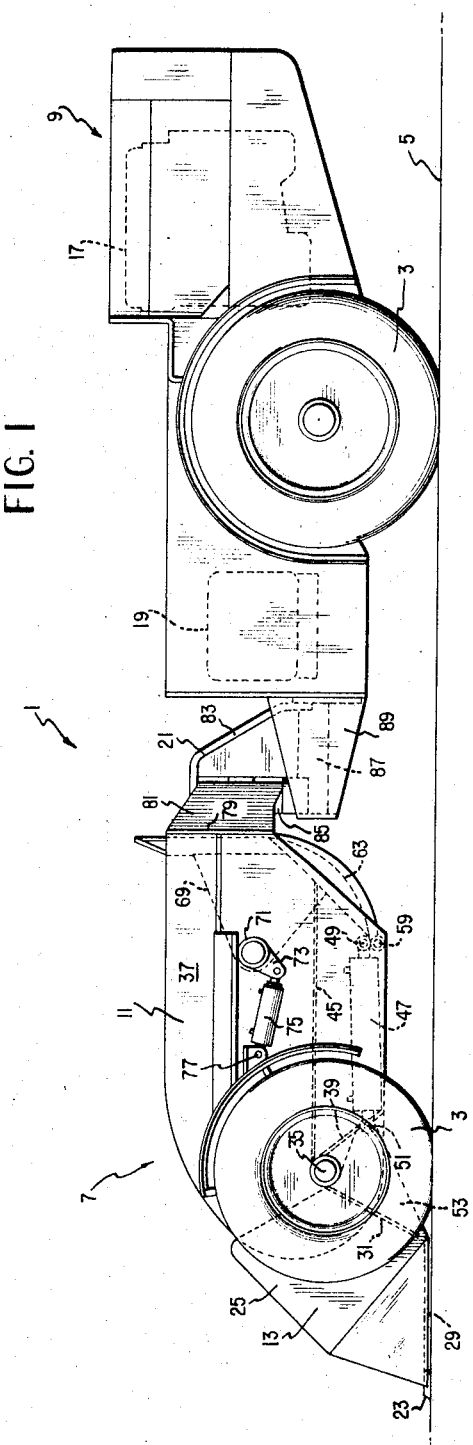
FIGURE 1 is a side elevational view of a self-loading vehicle according to the present invention, showing the vertically swinging load support in a lower position.

The broad outline of the self-loading vehicle of this invention can be seen by referring to FIGURES 1 and 4 of the drawings. As is there shown, a self-loading vehicle indicated generally at 1 is supported by four wheels 3 on a level surface 5 such as the ground or the concrete flooring of a storage building or the floor of a mine or the like. Vehicle 1 is articulated and comprises a pair of articulately interconnected body portions, comprising a front body portion 7 and a rear body portion 9. Front body portion 7 includes a material-receiving body 11 adapted to receive, support and discharge a quantity of material, and front body portion 7 also includes a vertically swinging load support in the form of a shovel 13 adapted to dig into material to be loaded into body 11 and to elevate and discharge rearwardly that material into body 11. Thus vehicle 1 is more of the loading machine type than of the excavator type. The bottom of material-receiving body 11 is closed by a door that moves horizontally rearwardly to open and dump the load from body 11. Rear body portion 9 carries an engine 17 at the rear thereof that drives rear wheels 3 through a transmission. Wheels 3 may of course be rear-wheel driven, four-wheel driven, rear-wheel braked or four-wheel braked. Rear body portion 9 also carries an operator's station 19 including the usual seat and steering wheel, station 19 being so arranged that the operator faces to the side, which is to the right when facing in the direction of forward vehicle movement. A coupling 21 articulately interconnects front and rear body portion 7 and 9 so that they track.

The broad outline of the operation of the device is also apparent from a consideration of FIGURES 1, 2, 3, 6 and 7. The vehicle moves close to the material to be loaded with the shovel in the lowered full-line position of FIGURES 1 and 2. The vehicle is then crowded forward to load the front portion of the shovel without undue crowding effort. Then, with the vehicle stationary, the shovel is swung forwardly and upwardly from the position of FIGURE 2 to the position of FIGURE 3, to complete the loading of the shovel and to discharge the load from the shovel into the material-receiving body. The vertically swinging load support is returned to a lowered position and the loading operation is repeated as needed until the material-receiving body contains the desired load, whereupon the vehicle can be driven from the loading station to a dumping station. When the material in the material-receiving body has been carried to its destination, the door can be opened by retracting it horizontally rearwardly to unload the material-receiving body.

Referring now to the vehicle structure in greater detail, shovel 13 at the front of the vehicle is provided with teeth 23 to help the forward edge of the shovel penetrate the material to be loaded. Shovel 13 also has opposite side walls 25 to confine the material and a bottom wall 27 that supports the material. Bottom wall 27 is comprised by a front portion 29 that is contiguous to the ground when shovel 13 is in a lower or ground-engaging position as seen in FIGURE 1 and a rear portion 31 that is upwardly rearwardly inclined in the shovel position seen in FIGURE 1. Rear portion 31 terminates at its upper rear edge in a hinge element 33. Shovel 13 is thus mounted for vertical swinging movement on a horizontal axis that is disposed sufficiently high to assure that shovel 13 will have a desirably large capacity but sufficiently low that shovel 13 will require only a minimum of headroom when raised. A convenient mounting for shovel 13 is on axle 35 with hinge element 33 encircling and rotatably bearing on axle 35 so that shovel 13 swings coaxially with wheels 3. The diameter of wheels 3 can be chosen so as to position the axis of shovel 13 at a desired height.

Figure 5:
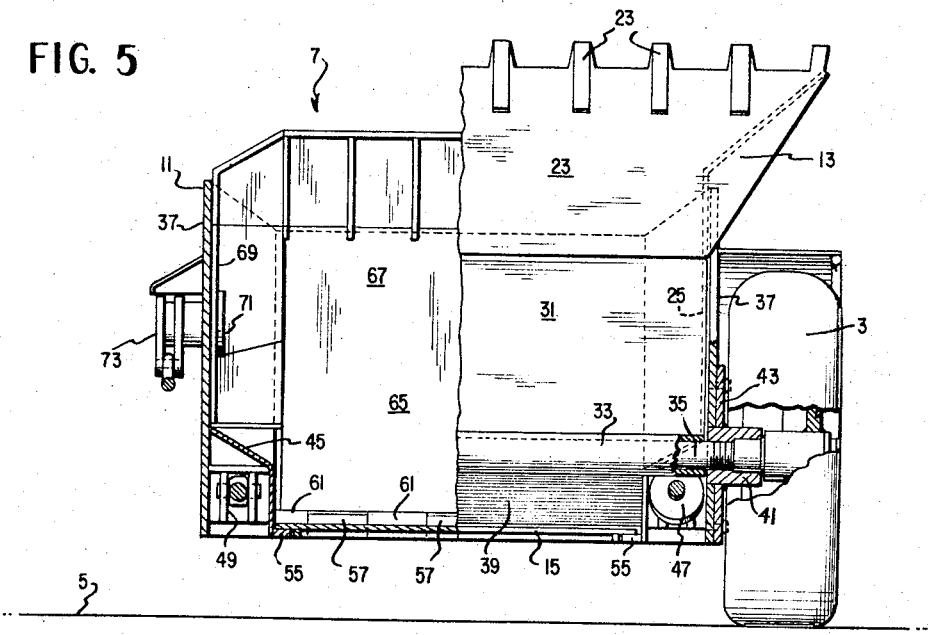
FIGURE 5 is a front view of the self-loading vehicle of FIGURE 1, with parts broken away the better to illustrate the internal structure of the vehicle.

Material-receiving body 11 is made up of a pair of opposite generally vertical side walls 37 and a downwardly rearwardly inclined bottom wall 39 that is fixedly secured between side walls 37 and terminates at its upper forward edge closely adjacent hinge element 33. A collar 41 is rigidly mounted on axle 35 adjacent each end inwardly of wheels 3 and carries a plate 43 that bears against the outer side of side walls 37 where axle 35 passes through those side walls, as seen in FIGURE 5. Plates 43 are rigidly attached to side walls 37. Collars 41 thus restrain side walls 37 against inward and outward movement under the influence of a load and axle 35 ties together the side walls to strengthen the vehicle structure.

A pair of inwardly downwardly inclined wing portions 45 on the inner sides of side walls 37 provide hoods under and within which are disposed fluid motors 47 one on either side of material-receiving body 11, as is seen in FIGURE 5. At their rear ends, motors 47 are mounted on body 11 for vertical swinging movement about a rear pivotal axis at 49; and at their forward ends, fluid motors 47 and shovel 13 are pivotally interconnected for vertical swinging movement relative to each other about a forward pivotal axis 51. Specifically, ears 53 extend rearwardly from adjacent opposite sides of the rear of shovel 11 and provide at their rear ends pivotal interconnections with the forward ends of the piston rods of fluid motors 47. Fluid motors 47 each have inlet and outlet conduits (not shown) by which they are supplied continuously with pressure fluid from a source of pressure fluid (not shown).

Figure 3:
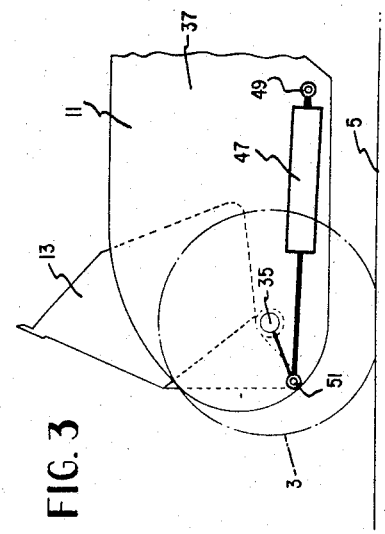
FIGURE 3 is a view similar to FIGURE 2 but showing the same relationships when the vertically swinging load support is in an upper position.
Figure 2:
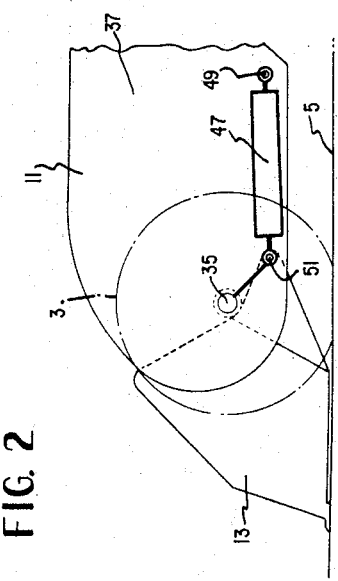
FIGURE 2 is a diagrammatic view illustrating certain mechanical relationships between the principal parts of the vertically swinging load support when the vertically swinging load support is in a lower or ground-engaging position.

The operation of the self-loading vehicles as thus far described can best be seen by a comparison of FIGURES 1, 2 and 3. After the vehicle has been crowded into the material to be loaded, with shovel 13 in the position of FIGURES 1 and 2, fluid motors 47 are actuated to swing shovel 13 from the position of FIGURE 2 to the position of FIGURE 3. The relationships of the angles of the various portions of the shovel and its actuating means are an important feature of this invention and can best be seen by a consideration of FIGURES 2 and 3. Let it be considered that there are three points of articulation in the shovel-actuating mechanism: the axis of vertical swinging movement of shovel 13, which could have a number of different positions but which is shown by way of example in the drawings as being coaxial with the axle 35; the rear pivotal axis 49 of fluid motors 47; and the front pivotal axis 51 which is the joint between the fluid motors and the shovel. Let it be considered that the axis of shovel 13 and axis 51 lie in a first common plane, and that axes 49 and 51 lie in a second common plane which also includes the axes of fluid motors 47. Thus, the thrust that raises shovel 13 from the position of FIGURE 2 to the position of 3 is always applied in that second plane, that is, axially of fluid motors 47.

The angles that those two planes form with each other are important features of the invention. Notice that in FIGURE 2, in the lowermost shovel position, those two planes are at an obtuse angle to each other. As fluid motor 47 is extended, however, the angle between the two planes passes through a right angle and becomes an acute angle of progressively greater acuity, until the position of FIGURE 3 is reached, in which the two planes are disposed at an acute angle to each other which is less than 90° by an amount substantially greater than the amount that the obtuse angle of FIGURE 2 is greater than 90°. For example, the obtuse angle between the planes as seen in FIGURE 2 might be about 120°, while the acute angle between the planes as seen in FIGURE 3 might be around 20°. The total arc traversed by axis 51 might be around 120°, the two planes being at right angles to each other after about 30° of that arc has been transversed. Thus, axis 51 traverses a substantially greater arc after the planes are disposed at right angles to each other than before the planes are disposed at right angles to each other.

The significance of this relationship of the angles of the two planes to each other is quite great, because the angles of those two planes to each other determine both the force that is applied to the shovel and the speed at which the shovel is caused to travel. In general, the greater the force, the slower the speed; and the greater the speed, the less the force. For example, in the first 60° of arcuate travel of axis 51 from the position of FIGURE 2, that is, about 30° on either side of the right angular relationship of the two planes, the thrust imposed by motors 47 on the shovel is at or near its maximum. However, as the two planes approach the position of FIGURE 3, it will be evident that continued outward extension of the fluid motor 47 results in a greatly multiplied angular velocity of shovel 13. Thus, it will be apparent that in the present instance the greater the thrust, the less the angular velocity; and the greater the angular velocity, the less the thrust. This relationship is particularly advantageous in the present invention, because it enables slow loading from a forwardly crowded loading position with a maximum of power; but this relationship also assures that once the shovel 13 has been loaded, it will be swung upwardly with increasing velocity until the contents of the shovel are thrown a desirably great distance to the rear in the material-receiving body. In other words, the thrust exerted by fluid motor 47 varies directly as the distance between the axis of shovel 13 and that second plane; while the angular velocity imparted by fluid motor 47 varies inversely as that distance.

The movement of the shovel-raising mechanism is also characterized in that fluid motors 47 and their common or second plane swing from the position of FIGURE 2 downwardly through a relatively small angle until the first plane is vertical, and then swing upwardly through a relatively large angle to the position of FIGURE 3.

Another feature of the upward swinging movement of shovel 13 is that by virtue of the configuration of shovel 13, it serves in its raised position both as a forward and upward extension of inclined bottom wall 39 of material-receiving body, with which it is in alignment at that time, and also as a means not only for throwing its own load to the rear but also for forcing to the rear the load previously deposited in the material-receiving body. This last function arises by virtue of the fact that portion 29 of shovel 13 is upwardly rearwardly inclined in the uppermost position shown in FIGURE 3.

Figure 6:
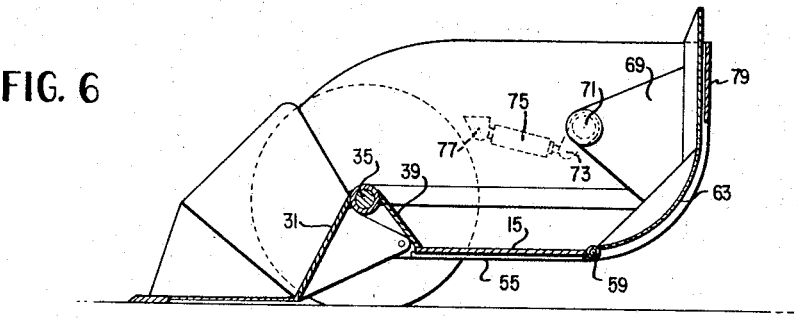
FIGURE 6 is a fragmentary cross-sectional view of the material-receiving body of a self-loading vehicle according to this invention, showing the bottom door in its closed or material-supporting position.
Figure 7:
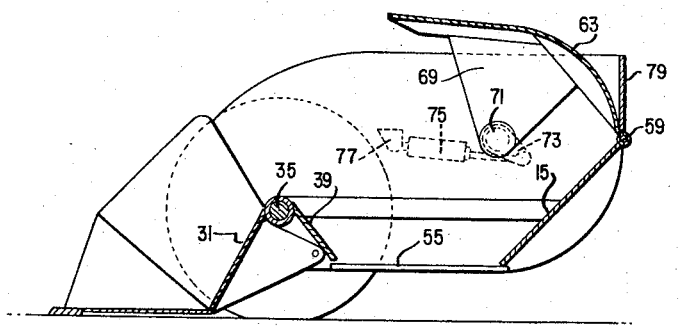
FIGURE 7 is a view similar to FIGURE 6 but showing the bottom door in its open or material-dumping position.

It is also important to note that the inclined portion 31 of shovel 13, the hinge element 33, and downwardly inclined bottom wall 39 of material-receiving body 11 all coact to provide a substantially continuous material-receiving and supporting surface from the shovel over the axle and into the material-receiving body, as is best seen in FIGURES 6 and 7. Indeed, the configuration of elements 31 and 39, in conjunction with their locations relative to axle 35, assures that there will be a substantially continuous material-supporting surface that extends up and over the axle and that in all positions of shovel 13 assures against the provision of pockets in which material may be caught and held. At the same time, inclined bottom wall 39 provides a forward barrier to prevent material in body 11 from spilling back out of body 11.

Returning now to the structure of the invention, and moving rearwardly of the vehicle, the structure and operation of door 15 is another important feature of the invention and can best be seen in FIGURES 6 and 7, with reference also to FIGURES 1, 4 and 5. Door 15 is flat and horizontal and is supported along its opposite longitudinal side edges in the closed position by a pair of guide strips 55 that are secured as by welding to the lowermost parts of the inner sides of side walls 37 of material-receiving body 11, as best seen in FIGURE 5. Guide strips 55 are thus horizontal and coplanar in a horizontal plane. Inclined bottom wall 39 of body 11 is spaced a short distance above the forward ends of guide strips 55, and door 15 fits closely under the lower edge of wall 39, as best seen in FIGURE 6.

Along its rear edge, door 15 carries a plurality of laterally spaced hinge elements 57 that encompass and swing hingedly on a hinge rod 59 that is horizontal and parallel to axle 35, as best seen in FIGURE 4. Hinge rod 59 in turn is encompassed by a plurality of hinge elements 61 that interfinger between hinge elements 57 and that are carried by the forward lower edge of a rear wall portion 63 of body 11. Rear wall portion 63 is comprised of a lower arcuate portion 65 that merges with an upright generally uniplanar portion 67. Rear wall portion 63 is mounted for vertical swinging movement on a pair of flat arms 69 disposed one closely adjacent and parallel to each side wall 37 of body 11 on the inner sides of side walls 37. Arms 69 are provided at their upper forward ends with trunnions 71 by which they are pivotally mounted on a horizontal axis on side walls 37 at about the center of curvature of arcuate portion 65. A crank arm 73 is rigid with each trunnion 71 and extends radially of the axis of vertical swinging movement of rear wall portion 63 and is connected a certain distance from that axis with the piston rod of a fluid motor 75 that in turn is mounted on body 11 for vertical swinging movement about a horizontal axis at 77. Fluid motors 75, like motors 47, are continuously supplied with pressure fluid through delivery and return conduits (not shown). Naturally, the structure of arm 69, trunnion 71, crank arm 73, and fluid motor 75 is duplicated at each side of body 11.

The operation of door 15 can best be appreciated by comparing FIGURES 6 and 7. FIGURE 6 shows the door in the closed position, in which door 15 is horizontal and comprises a rearward extension of bottom wall 39. To the rear of door 15, rear wall portion 63 closes the rear end of body 11. When it is desired to open door 15 to dump the load in body 11, it is necessary only to actuate fluid motors 75, which turn crank arms 73 counterclockwise as seen in FIGURES 6 and 7 to cause rear wall portion 63 to swing counterclockwise inasmuch as rear wall portion 63 is in unitary assembly with crank arm 73 and trunnions 71. The pivotal mounting of door 15 at hinge rod 59 thus swings in a circular arc counterclockwise from the position of FIGURE 6 to the position of FIGURE 7. Door 15 is free to pivot relative to hinge rod 59, however, and thus does not follow quite the same path of movement as rear wall portion 63. Instead, the rear portion of door 15 moves in a path closely approximating the arc of hinge rod 59, while the front portion of door 15 moves only horizontally rectilinearly rearwardly because the forward edges of those portion of doors 15 that contact guide strips 55 continue to ride slidingly on strips 55 as door 15 moves to the rear. In its fully open position, door 15 is disposed at an angle greater than the angle of repose of the material on door 15 so that body 11 empties completely. It should also be noted that upright portion 67 also aids in discharging material from body 11 when door 15 opens, for upright portion 67 moves arcuately about a path that tends to urge the upper rear material in body 11 forwardly and downwardly, as seen by comparison of FIGURES 6 and 7.

This movement of door 15 is a very important feature of the invention, because it assures that door 15 will not fall below its closed position upon opening, nor will it move rearwardly beyond the arcuate path of hinge rod 59 upon door-opening movement. At the same time, however, door 15 will not be forced up into the material in body 11 to any significant extent during door-opening movement. It will therefore be apparent that material-receiving body 11 may be positioned quite close to the level of the supporting surface 5 without interference with the door-opening movement. At the same time, however, material-receiving body 11 may be quite elongated rearwardly without having door 11 move even farther to the rear upon door-opening movement. Thus, the movement of door 15 upon opening does not require that material-receiving body 11 be raised to any given height above surface 5 nor does it require that the rearmost portion of material-receiving body 11 be maintained at any given forward position. Also, the fact that door 15, upon opening, intrudes only very little into the confines of body 11 means that even the heaviest loads in body 11 will not substantially impede door-opening movement. In short, therefore, a design and operation of door 15 and its associated actuating mechanism has been achieved with does not limit the size of material-receiving body in any way. This means, therefore, that a maximum size and load-carrying capacity can be achieved for material-receiving body 11 at the same time that body 11 can be unloaded by dumping.

Moving still farther rearwardly of the vehicle, it will be seen that the side walls 37 of material-receiving body 11 are tied together at their rear ends by a rear support 79 that is generally vertically disposed and extends from the top of walls 37 a substantial distance downwardly but terminates in a lower edge spaced a substantial distance above the bottom of body 11. In the closed position of door 15, upright portion 67 of rear wall portion 63 is generally parallel and closely contiguous to rear support 79. Indeed, rear support 79 can prevent further clockwise movement of rear wall portion 63, as seen in FIGURE 6, at about the same time that guide strips 55 can prevent further clockwise movement of hinge rod 59 and hinge elements 57 and 61, as also seen in FIGURE 6. Thus, upright portion 67 and rear support 79 vertically overlap each other a substantial vertical distance as seen in FIGURE 6. Upon full door-opening movement, however, as seen in FIGURE 7, the lower edge of rear support 79 can perform the function of limiting further counterclockwise movement of hinge rod 59 and hinge elements 57 and 61. Rear support 79 thus performs the unique triple functions of tying together the rear of the side walls of the material-receiving body, of limiting closing movement of the door, and of limiting opening movement of the door.

Again moving farther to the rear of the vehicle, it will be seen that in addition to these three functions, rear support 79 performs the additional function of supporting a bracket 81 that extends rearwardly of rear support 79 and that swingably supports the upper forward portion of a coupling member 83 by supporting a vertical pivotal sleeve 85 that pivotally interconnects bracket 81 and coupling member 83 for horizontal swinging movement about a vertical axis, as best seen in FIGURE 1. At the lower rear side of coupling member 83, a horizontal sleeve 87, also seen in FIGURE 1, interconnects coupling member 83 and a bracket 89 which is mounted on and extends forwardly from rear body portion 9, for vertical swinging movement of coupling member 83 about a horizontal axis disposed no higher than at least one of the axes of the wheels 3. A fluid motor 91, best seen in FIGURE 4, is supported at one end on bracket 81 and at the other end on bracket 89 for horizontal swinging movement relative to both brackets about vertical axes, so that upon actuation of motor 91, the front and rear body portion 7 and 9 will be caused to swing horizontally relative to each other about vertical sleeve 85. Motor 91, like motors 47 and 75, is continuously supplied with pressure fluid through delivery and return conduits (not shown).

The arrangement and operation of the coupling 21 provided by bracket 81 and coupling member 83 and bracket 89 and their associated vertical sleeve 85 and horizontal sleeve 87 are still another important feature of the invention. It is to be noted especially that vertical sleeve 85 is above the forward end of horizontal sleeve 87, that bracket 81 is at a higher level than bracket 89, that the rear of material-receiving body 11 extends quite close to vertical sleeve 85 and the forward end of horizontal sleeve 87, and that the axis of vertical sleeve 85 is disposed about midway between the axes of the front and rear wheels of the vehicle. These relationships make for a number of important new results. In the first place, the disposition of vertical sleeve 85 above the forward end of horizontal sleeve 87 permits the material-receiving body 11 to extend as far to the rear as possible and thus to have the greatest possible load-carrying capacity. At the same time, the positioning of the axis of vertical sleeve 85 about midway between the front and rear wheel axes assures that the two body portions 7 and 9 will track about a curve. The disposition of horizontal sleeve 87 below vertical sleeve 85 assures that the axis of horizontal sleeve 87 will be disposed as low as possible; and indeed, the lower the better. In this way, with the axis of horizontal sleeve 87 disposed as low as possible, it has been found that the axes of the front and rear wheels will move out of parallelism with each other so that each wheel may find its subjacent support on uneven terrain. This feature is particularly useful in connection with a self-loading vehicle having a vertically swinging load support of the front-loading shovel type, for it assures that the shovel will always be substantially parallel to the surface on which the front wheels rest and will thus be able to load down as close as possible to that surface. This feature is also important in that it permits effective use of four-wheel drive or four-wheel braking, so that greater tractive effort or braking force may be applied to the wheels during the loading operation. If the vehicle is used for loading solely by crowding, then this greater tractive ability is advantageous; while if the vehicle is used for loading in a stationary position with the loading effort applied by fluid motors 47, then the greater braking force made possible by this feature is of benefit. Positioning the axis of horizontal turning movement of the body portions relative to each other as low as possible also reduces to a minimum the lateral forces applied to any of the three supported wheels when the fourth wheel drops, that is, when the wheel axles cant relative to each other about horizontal sleeve 87.

From a consideration of the foregoing disclosure, it will be obvious that all of the initially recited objects of the present invention has been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What I claim is:

1. In a self-loading vehicle including an elongated material receiving body having a front wall, means pivotally mounted to one end of the material receiving body for loading material in said body upstanding spaced apart side walls, a rear end section, a bottom section provided with a dump opening, and closure means for said dump opening, the improvement in said closure means including a first plate member slidably supported adjacent said dump opening and having at least a portion thereof covering said dump opening when said first plate member is in a first position; a second plate member movable with respect to said body and spaced rearwardly of and at least in part upwardly of said first plate member and having a front end portion thereof hingedly connected to a rear end portion of said first plate member, and said second plate member being supported to move in an upwardly generally arcuate path such that said first plate member will move to a second position to open said dump opening over a path directed rearwardly and upwardly with respect to said dump opening.

2. The improvement as set forth in claim 1 wherein said first plate member is slidably supported at the front end thereof for horizontal movement.

3. The improvement as set forth in claim 1 wherein said second plate member is pivoted at the front end thereof to the rear end of said first plate member.

4. The improvement as set forth in claim 1 wherein at least a portion of said second plate member forms at least a part of a rear wall for said rear end section.

5. The improvement as set forth in claim 2 wherein the front end portion of said second plate member has a shape being upwardly concave toward said front wall.

6. The improvement as set forth in claim 5 wherein said second plate member is supported to move upwardly in a generally circular path having an axis coincident with the center of curvature of said front end portion of said second plate member.

7. The improvement as set forth in claim 6 wherein said front end portion of said second plate member subtends an arc of at least 90° about said axis of said circular path.

References Cited

UNITED STATES PATENTS

| | | | |
|---|---|---|---|
| 2,743,828 | 5/1956 | Hayes | 214—78 |
| 2,795,342 | 6/1957 | Steele | 214—78 |

GERALD M. FLORENZA, *Primary Examiner.*

ALBERT J. MAKAY, *Examiner.*